(12) United States Patent  
Scanlan

(10) Patent No.: US 7,496,614 B2  
(45) Date of Patent: Feb. 24, 2009

(54) METHOD FOR VISUALIZING DATA BACKUP ACTIVITY FROM A PLURALITY OF BACKUP DEVICES

(75) Inventor: Liam Scanlan, Bellevue, WA (US)

(73) Assignee: Bocada, Inc., Bellevue, WA (US)

( * ) Notice: Subject to any disclaimer, the term of this patent is extended or adjusted under 35 U.S.C. 154(b) by 0 days.

(21) Appl. No.: 10/790,955

(22) Filed: Mar. 1, 2004

(65) Prior Publication Data

US 2005/0015662 A1    Jan. 20, 2005

Related U.S. Application Data

(63) Continuation of application No. 09/665,269, filed on Sep. 19, 2000, now Pat. No. 6,745,210.

(51) Int. Cl.  
*G06F 17/30* (2006.01)

(52) U.S. Cl. .................. 707/204; 707/10; 707/104.1

(58) Field of Classification Search .................. 707/10, 707/104.1, 204  
See application file for complete search history.

(56) References Cited

U.S. PATENT DOCUMENTS

| | | | | |
|---|---|---|---|---|
| 5,517,555 A | * | 5/1996 | Amadon et al. | 455/408 |
| 5,729,735 A | * | 3/1998 | Meyering | 707/10 |
| 5,754,782 A | * | 5/1998 | Masada | 709/213 |
| 5,758,359 A | * | 5/1998 | Saxon | 707/204 |
| 5,796,999 A | * | 8/1998 | Azagury et al. | 707/10 |
| 5,813,017 A | * | 9/1998 | Morris | 707/204 |
| 5,857,208 A | * | 1/1999 | Ofek | 707/204 |
| 5,890,165 A | * | 3/1999 | Boudrie et al. | 707/202 |
| 5,958,012 A | * | 9/1999 | Battat et al. | 709/224 |
| 6,006,227 A | * | 12/1999 | Freeman et al. | 707/7 |
| 6,035,412 A | * | 3/2000 | Tamer et al. | 714/6 |
| 6,038,569 A | * | 3/2000 | Beavin et al. | 707/203 |
| 6,289,380 B1 | * | 9/2001 | Battat et al. | 709/224 |

* cited by examiner

*Primary Examiner*—Jean M Corrielus  
(74) *Attorney, Agent, or Firm*—DLA Piper LLP (US)

(57) ABSTRACT

A method and system for examining historical records of backup activity consolidated from a plurality of backup engines is disclosed. The method includes reorganizing historical records of backup activity originating from a plurality of backup engines into unique visual representations to facilitate the identification of backup activity failures. The method allows representation of many levels of data extraction relating to backup successes, partial successes, and failures. In another aspect, a method of combining summary level data (summarized by backup server) with subsequently lower levels of detail in a single report that provides the ability to expand and contract at will is provided. In another aspect, a system for associating owners of computers being backed up with respective backup charges, rearranging data extracted from the RDB consisting of historical records originating from different backup engines, and constructing Billing Reports to reflect charges relating to said backup activities.

8 Claims, 8 Drawing Sheets

FIG. 7

METHOD FOR VISUALIZING DATA BACKUP ACTIVITY FROM A PLURALITY OF BACKUP DEVICES

Figure 1:
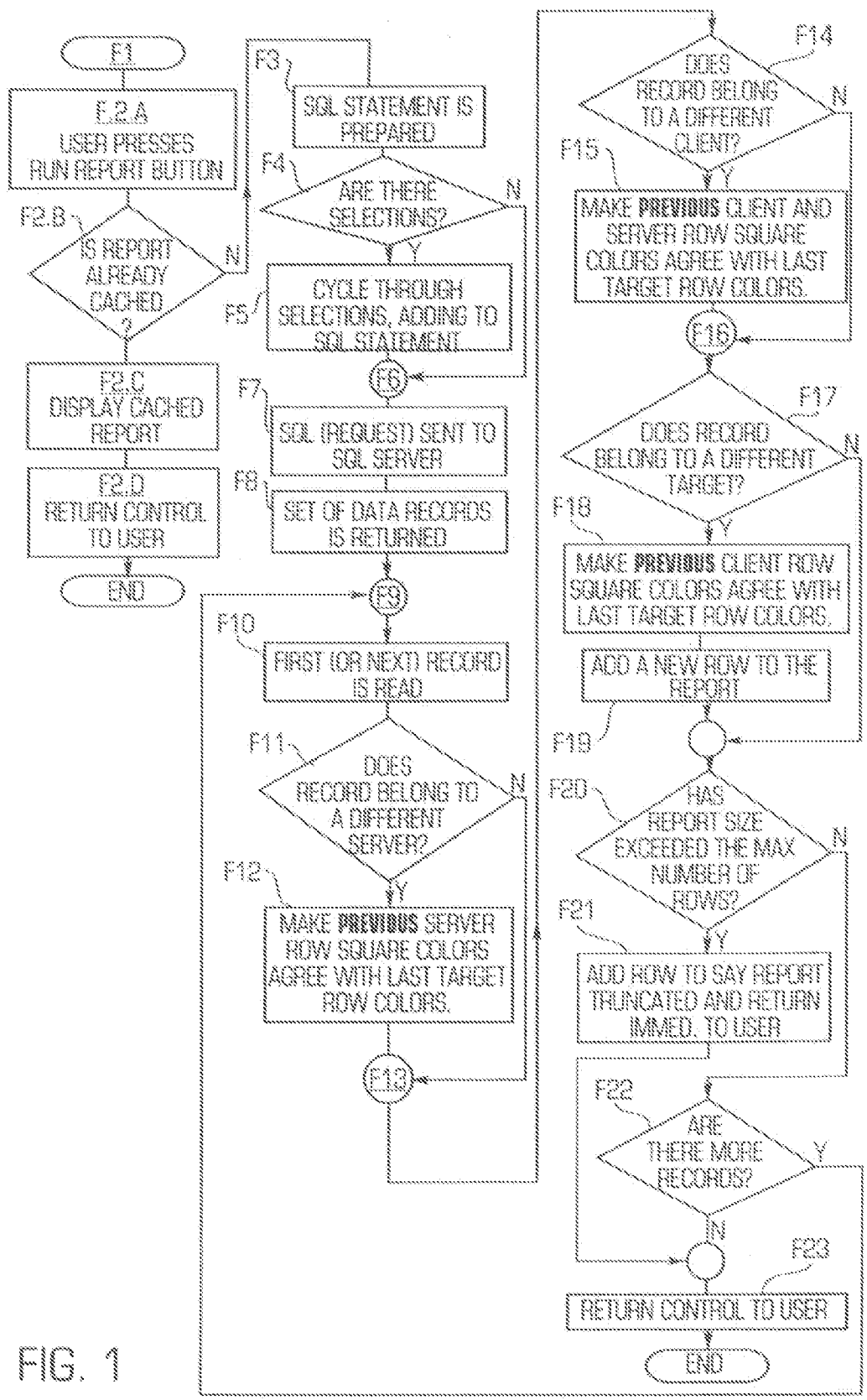

This application is a Continuation of and claims priority, under 35 U.S.C. § 120, from U.S. application Ser. No. 09/665,269 filed on Sep. 19, 2000, now U.S. Pat. No. 6,745,210 the content of which is incorporated by reference herein.

CROSS-REFERENCE TO RELATED APPLICATIONS

Patent application of Cory Bear and Liam Scanlan EXTENSIBLE METHOD FOR OBTAINING AN HISTORICAL RECORD OF DATA BACKUP ACTIVITY (AND ERRORS) AND CONVERTING SAME INTO CANONICAL FORMAT Patent application of Liam Scanlan and Cory Bear METHOD FOR EXTRACTING AND STORING HISTORICAL RECORDS OF DATA BACKUP ACTIVITY FROM A PLURALITY OF BACKUP DEVICES

FEDERALLY-SPONSORED R&D

No federally sponsored research and development was involved in the creation of this invention.

MICROFICHE APPENDIX

No Microfiche has been submitted with this patent application

BACKGROUND

1. Field of the Invention

The present invention is related generally to electronic/software backup and more particularly to simultaneous and seamless examination of such historical records of backup activity performed across a plurality of backup engines.

2. Description of Prior Art

Most backup engines in use today provide for the repeated, regular electronic transfer, over a network, of data from the point at which it is in regular use to a medium, such a magnetic tape, for the purposes of securing a fall-back situation should damage occur to the original data. Included in the list of such software programs, are programs that work on relatively small amounts of data, sometimes on a one-computer-to-one-tape-drive basis, and others that work on very large amounts of data, with banks of tape drives that are used to back up data from potentially thousands of computers connected to a network. Mostly, these backup engines use what is known as a "client/server" model. In the context of backup, this means that there is one computer (the "server") that controls and manages the actual backup activity, and other computers (the "clients") that get backed up by the "server". In this scenario, the backup tape drives are usually connected directly to the backup "server". There is also usually more than one backup server, each of which is responsible for the backup of data of numerous clients.

A central function of the activity of backup is the ability to "restore" data in the case of damage to the data that is in use. The backup server computer too usually controls this restore process. Understandably, the time it takes to recover data, and the confidence that the data recovery process will succeed, are two critical aspects of the backup and restore function as a whole. Disk drive capacities and data volumes, and consequently the volumes of data to be backed up, have historically been increasing at a greater rate than the backup server speed, tape drive capacity and network bandwidth are increasing to handle it. Accordingly, new technologies have been added to help. Such new technologies include fiber-optic cables (for fast data transfer across the network), faster chips, tape drives that handle more tapes, faster tape drives, "Storage Area Networks" and so on.

The activity of backup has become more and more critical, as the importance of the data has increased. At the advent of the desktop "revolution", that is, when people first started using personal computers (PCs), almost every piece of important data was still stored on one, single computer, possibly a mainframe or a minicomputer. As the numbers and types of computers proliferated, particularly on the desktop, and the purpose for which these desktops were now being used, making the data on such computers increasingly valuable, many different products designed to backup data were created and put into the marketplace. Now, there are some 50 or more different backup products in use by organizations and private individuals. Generally, but not always, such backup engines (products) have a reputation for being difficult to use. When there is an exception to this, the backup engine often has other, perhaps related, limitations (e.g. the amount of data is can back up is small).

Not all backup engines perform the same function. Thus, it is frequently necessary to have two or more different types of backup engines in use within the same organization, especially in large organizations. Anecdotally, one company has as many as 17 different backup engines in use somewhere in their organization. This is referred to as fragmentation. In large organizations, is has become necessary to hire expensive expertise to manage such large backup and restore services. The more varied their backup engines, the more expensive this becomes. Also, for large organizations, it has become increasingly likely that scheduled backup activities will fail. Because of the extra complexity of running a variety of backup engines, and because of the shear number of backup activities that need to take place regularly, failed backups often go unnoticed in a sea of extraneous backup information. An additional problem is that beyond a certain number of hours, perhaps minutes, if identifying a failed backup takes too long, then it often becomes too late for meaningful corrective action to be taken. As a result, large organizations often take an expensive "best guess" approach. Anecdotally, the level of confidence that large organizations live with regarding backup success is said to be about 80%. In other words, it is expected that no more that 4 out of 5 backups will be successful. Almost every large organization will relate experiences where data was lost because they mistakenly believed the data was been backed up.

Also, a problem that is of increasing significance is the fact that there is currently no practicable means of charging 3rd parties for backup services rendered, even though the sharp increase in organizations providing that service for pay is expected to continue.

In the marketplace today there are several backup reporting products available. Each works with only one backup engine. There are no known patents relating to any of the following backup reporting products.

1. Legato GEMS Reporter™, which provides trend analysis and text-based failures analysis. This product works with Legato NetWorker. It is built to handle up to approximately 4 or 5 average-sized backup servers.
2. Veritas Advanced Reporter™ 3.2 from Veritas is similar to GEMS Reporter.

3. SAMS Vantage™ provides statistical reports from backup activity of Computer Associates ArcServeIT product.

No known prior art combines backup statistics from a plurality of backup engines with monetary values to produce billing reports.

No known prior art provides billing reports based on backup activity statistics.

No known prior art uses an association with owners of data to control the grouping of data within such a billing report.

No known prior art allows the association of backup data amount pro rated pricing to control the amounts appearing on such billing reports.

SUMMARY

The present invention provides a method of visually representing historical records of backup activity across a plurality of backup engines, stored in a relational database, in such a way that key backup performance metrics are made obvious. In addition, said records are also organized and represented in such a way as to allow organizations to charge $3^{rd}$ parties for backup services rendered to those $3^{rd}$ parties.

TERMINOLOGY USED IN THIS DOCUMENT

Backup Engine

The term "backup engine" is used throughout this document. It means any software program, or part of a program, designed to backup electronic data onto a data storage medium such as magnetic tape. Veritas Backup Exec™ and IBM Tivoli™ Storage Manager are two well-known examples. There are over fifty backup engines generally available in the market today, and new ones are being created regularly. Although this patent does not name each specifically, the term plurality of backup engines is meant to cover any combination of two or more such backup engines.

SQL

All of the SQL used throughout the preferred embodiment adheres to the industry-standard known as ANSI SQL, American National Standards Institute, Structured Query Language. IBM invented the original SQL language during the 1960s.

SQL Server

As a place to store historical records of backup activity, the invention makes extensive use of, and accordingly references in this document to, a software program known as Microsoft SQL Server (SQL Server). One or more databases can be stored in and managed by an installation of SQL Server. This embodiment uses one database, named "backupreport". The tables directly or indirectly pertaining to this embodiment are detailed in FIG. 5. See also patents [applied for simultaneously to this patent].

Using SQL Server is the preferred embodiment.

BRG

The term BRG, an acronym used in this document for "Backup Report Graphical User Interface", is used to represent the embodiment disclosed in this patent application.

RDB

The term RDB, an acronym for Relational Database, is used throughout this document to represent the underlying source of data for reports described in this embodiment. The RDB contains historical records relating to backup activity across a plurality of backup engines. In the preferred embodiment, the RDB resides in an implementation of Microsoft SQL Server™ (described above).

Backup

The term Backup means the actual transfer of data that is in regular use, usually across a network, to a data storage medium, such as a magnetic tape, for the purposes of retrieval at a later date, should the data in regular use become damaged.

Backup Engine

The term Backup Engine means any software product or program that is used for the purposes of Backup described in the previous paragraph. For example, Legato NetWorker™, Veritas BackupExec™, BakBone NetVault™.

BX

This term is used throughout this document to denote a software component that provides an interface to a plurality of backup engines. By interface, it is meant the ability to request and receive historical records of backup activity from those backup engines.

Objects and Advantages

This invention provides:

1. A method of organizing and visually representing the data in such a way as to allow a person viewing the data to more quickly and reliably identify backup failures and successes.
2. A method of organizing and visually representing several (3, in this embodiment) additional levels of information to the user of the invention in accordance with an electronic request for information.
3. A method of organizing and visually representing historical records of backup activity originating from a plurality of backup engines in such a way as to enable a person viewing that representation to quickly and reliably identify trends in amounts of data being backed up by that plurality of backup engines.
4. A way to manage associations between owners of specific computers that get backed up, monetary charges for backups to such owners, and organization of such data in billing reports in such a way that the owners of computers being backed up can be billed for those services.
5. The invention combines backup statistics from a plurality of backup engines with monetary values to produce billing reports.
6. The invention provides billing reports based on backup activity statistics.
7. The invention uses an association with owners of data to control the grouping of data within such a billing report.
8. The invention allows the association of backup data amount pro rated pricing to control the amounts appearing on such billing reports.

Provides a means for including backup servers for subsequent examination by the invention.

Accordingly, a system and method in accordance with the present invention has significant utility over conventional backup activity examination.

Alternative Embodiments

Microsoft SQL Server was used in this embodiment. Other multi-purpose relational database servers such as Oracle™, SQLAnyWhere™, InterBase™, FoxBase™, Rbase™, or Xbase™, Dbase™ could have been used. Any other database would be considered an alternative embodiment.

The preferred embodiment uses an industry-standard "grid-style" component known as XGrid™ as a container for the Backup Failures report, but any one of several different grid-style components could have been used instead. It is indeed also possible to use a non-grid container that allows objects such as red and green squares to be created inside the container to implement the same essential method.

The preferred embodiment uses a product called ReportBuilder™ Pro for Billing Reports. Alternative embodiments are possible. There are numerous software products like ReportBuilder on the market, any one of which could have been used to produce the same result using a different embodiment.

DRAWING FIGURES

FIG. 1: A flowchart illustrating how the Backup Failures Analysis Report is created.

Figure 2:
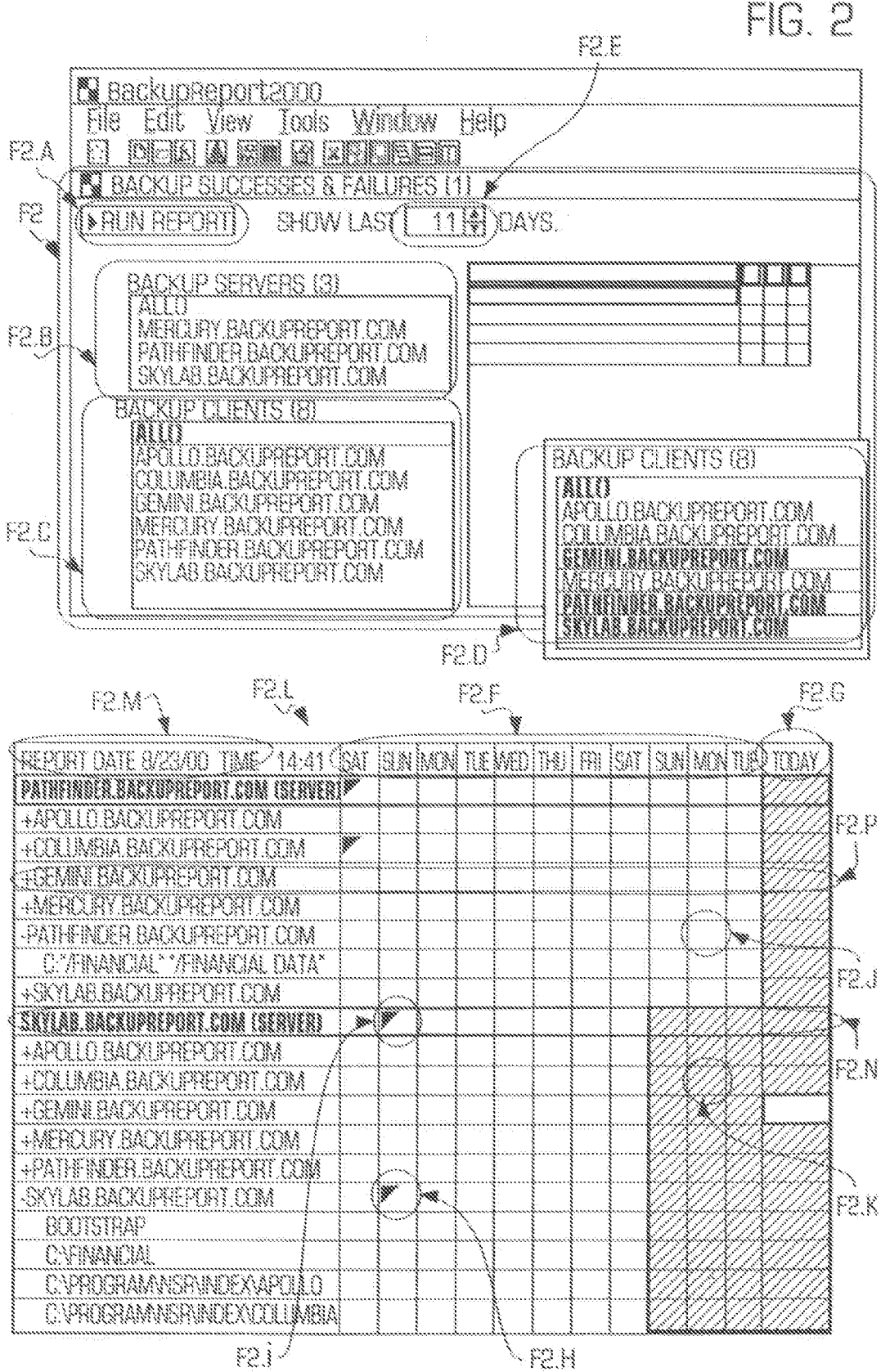

FIG. 2: illustrations of the visual objects that are used in the creation of the Backup Failures Analysis Report.

Figure 3:
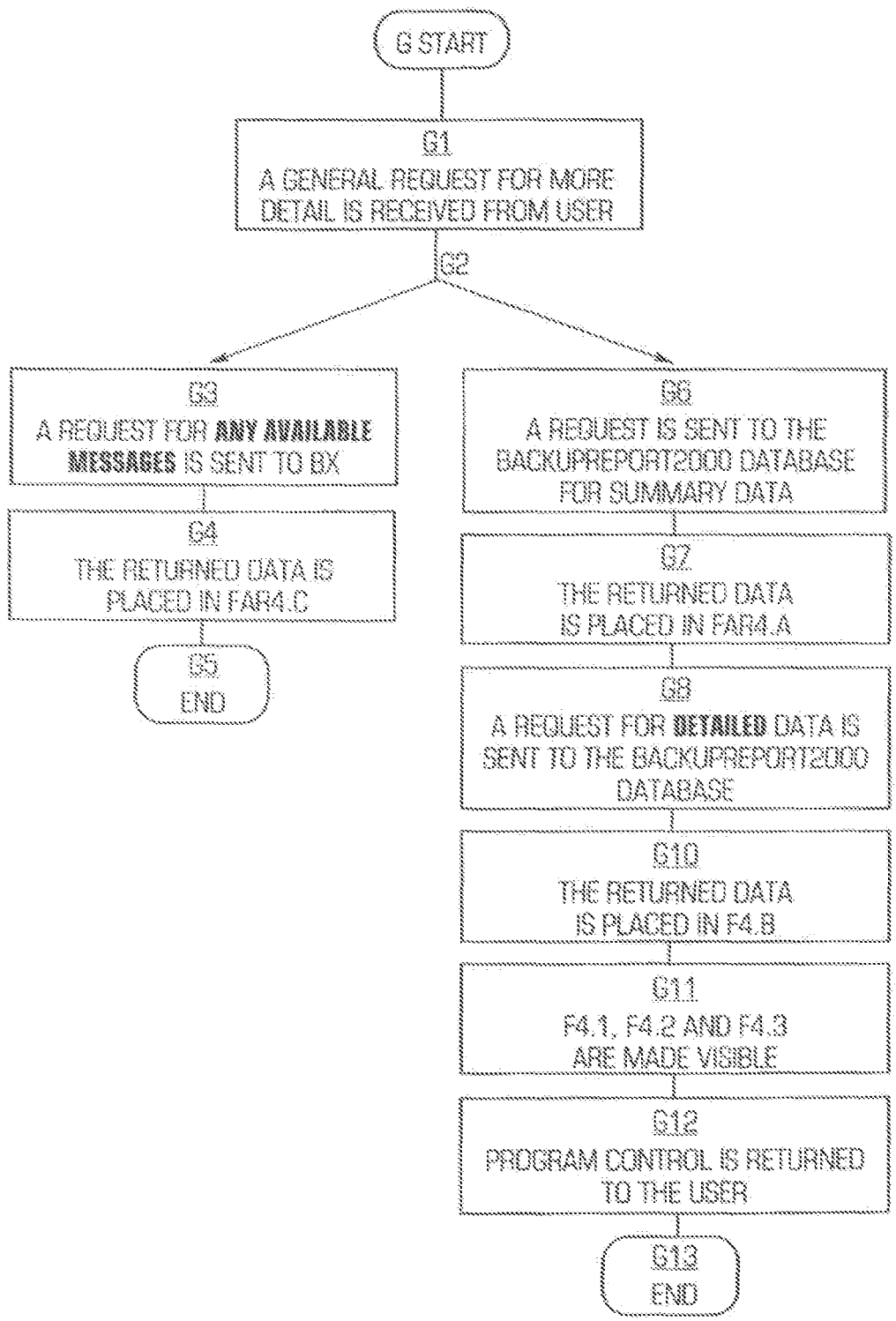

FIG. 3: a flowchart outlining the logic used and actions taken during the production of the optional three extra levels of detail in the Backup Failures Analysis Report.

Figure 4:
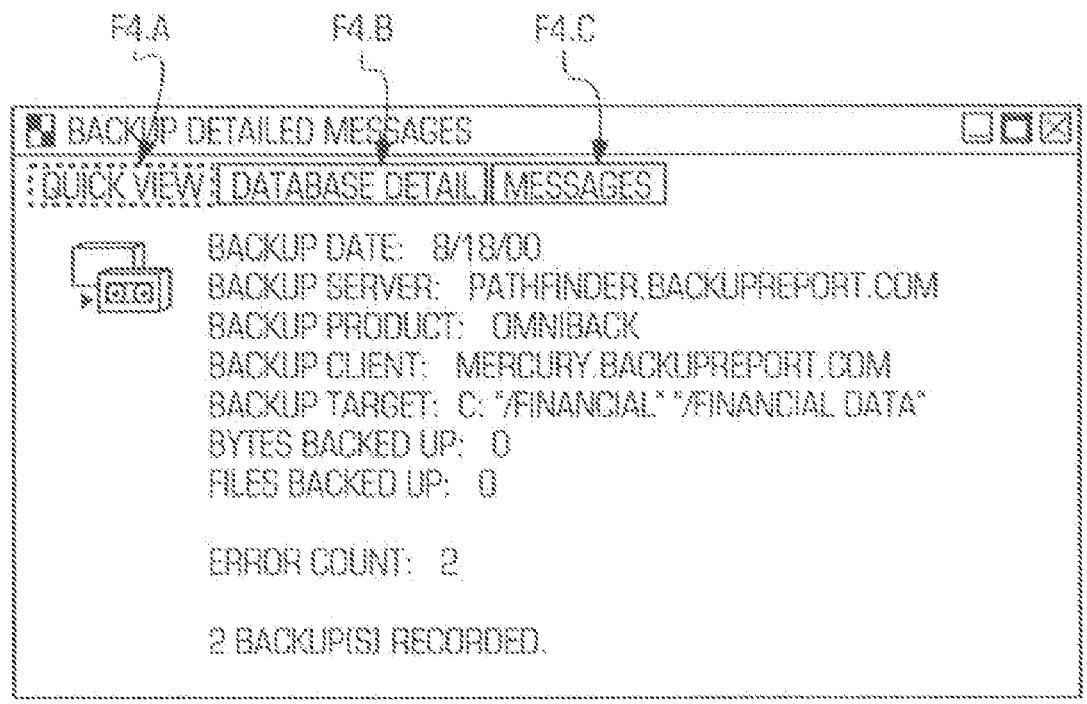

FIG. 4: an illustration of the visual object that is created for the purposes of providing a further 3 levels of backup detail to the user of the invention.

Figure 5:
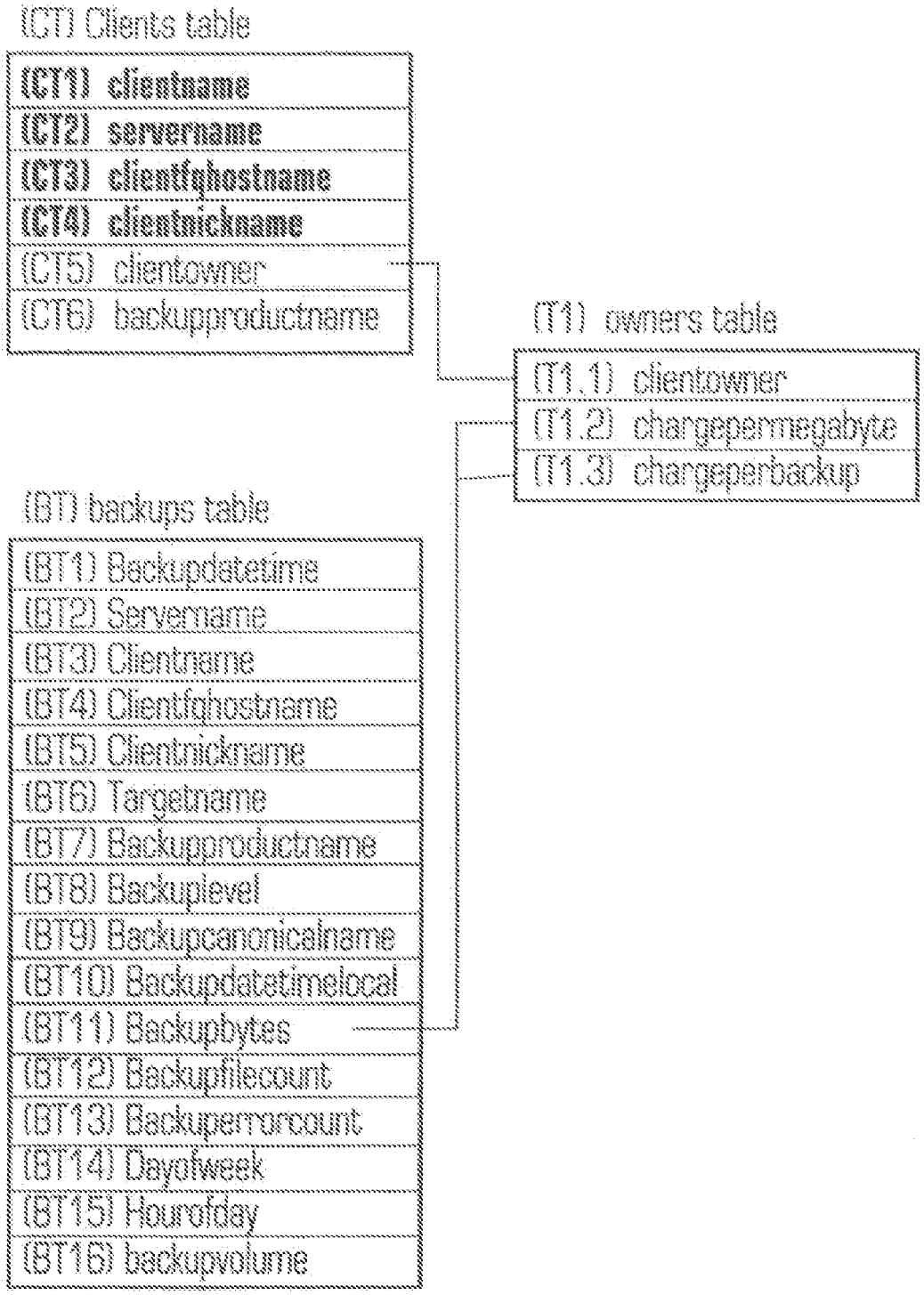

FIG. 5: an illustration of three database tables relevant to the Billing Report method.

Figure 6:
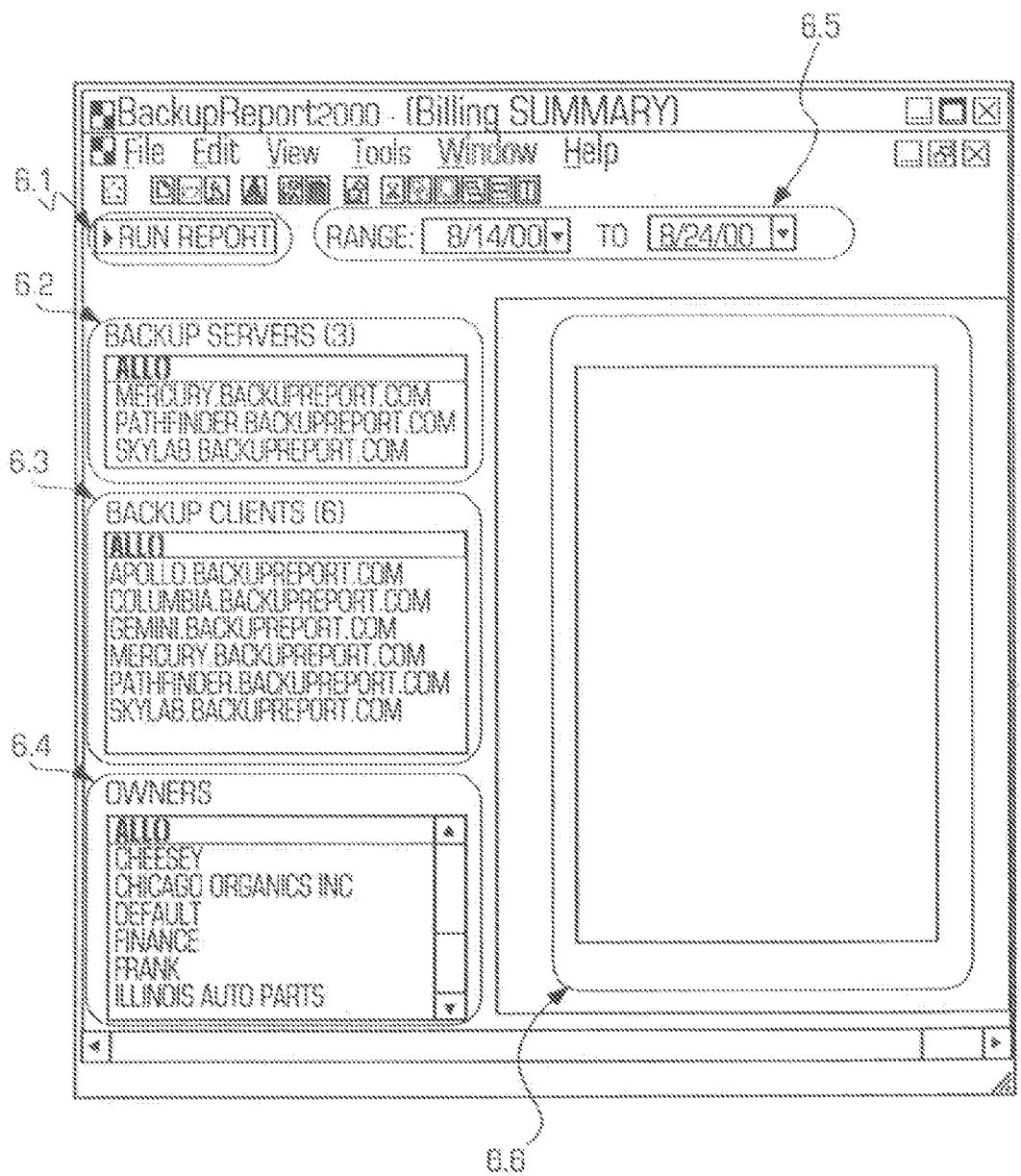

FIG. 6: an illustration of the Billing Report container, showing the critical elements used to invoke the production of a Billing Report and showing the Billing Report container.

Figure 7:
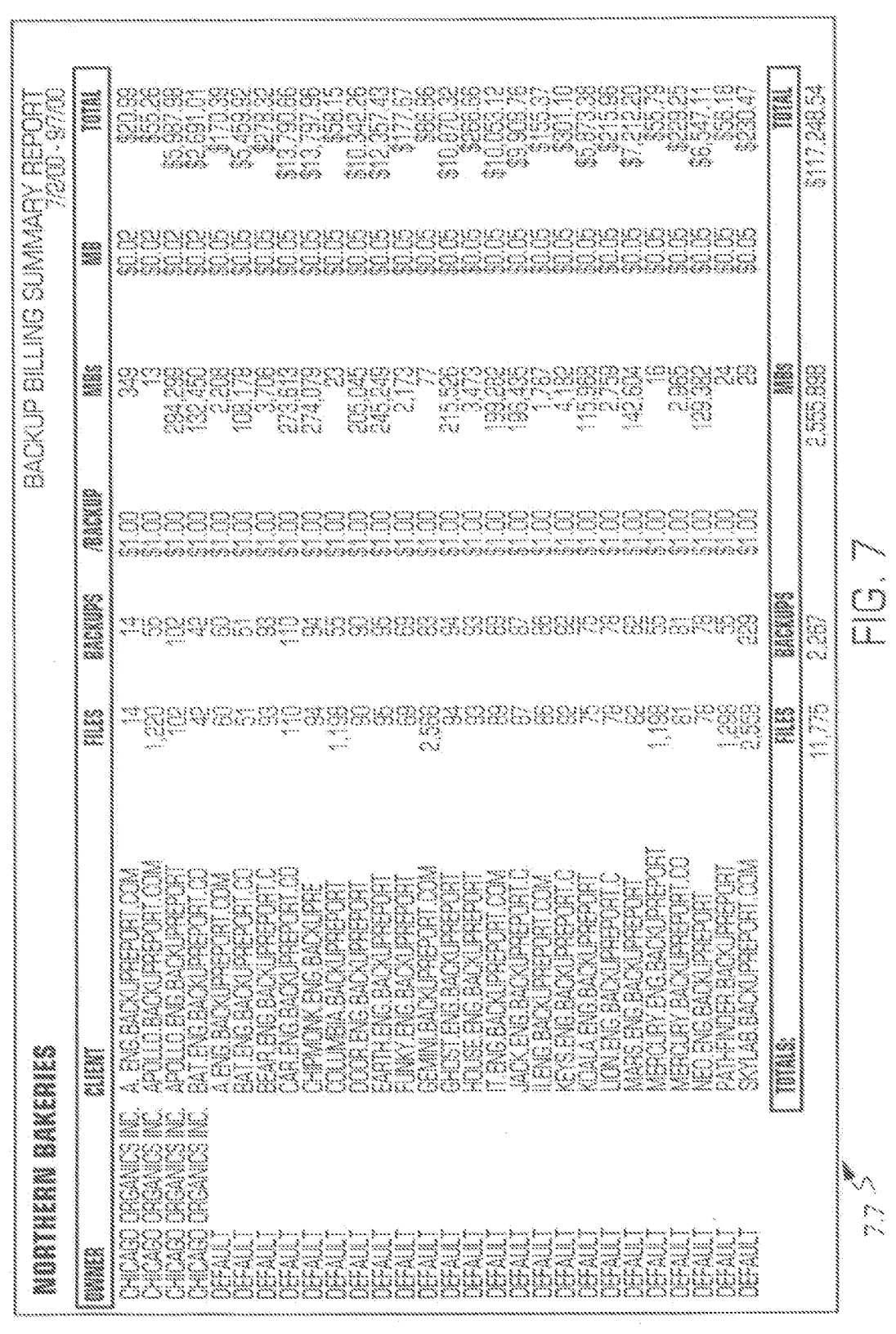

FIG. 7: an illustration of how a billing report looks when executed using the embodiment described in this document.

Figure 8:
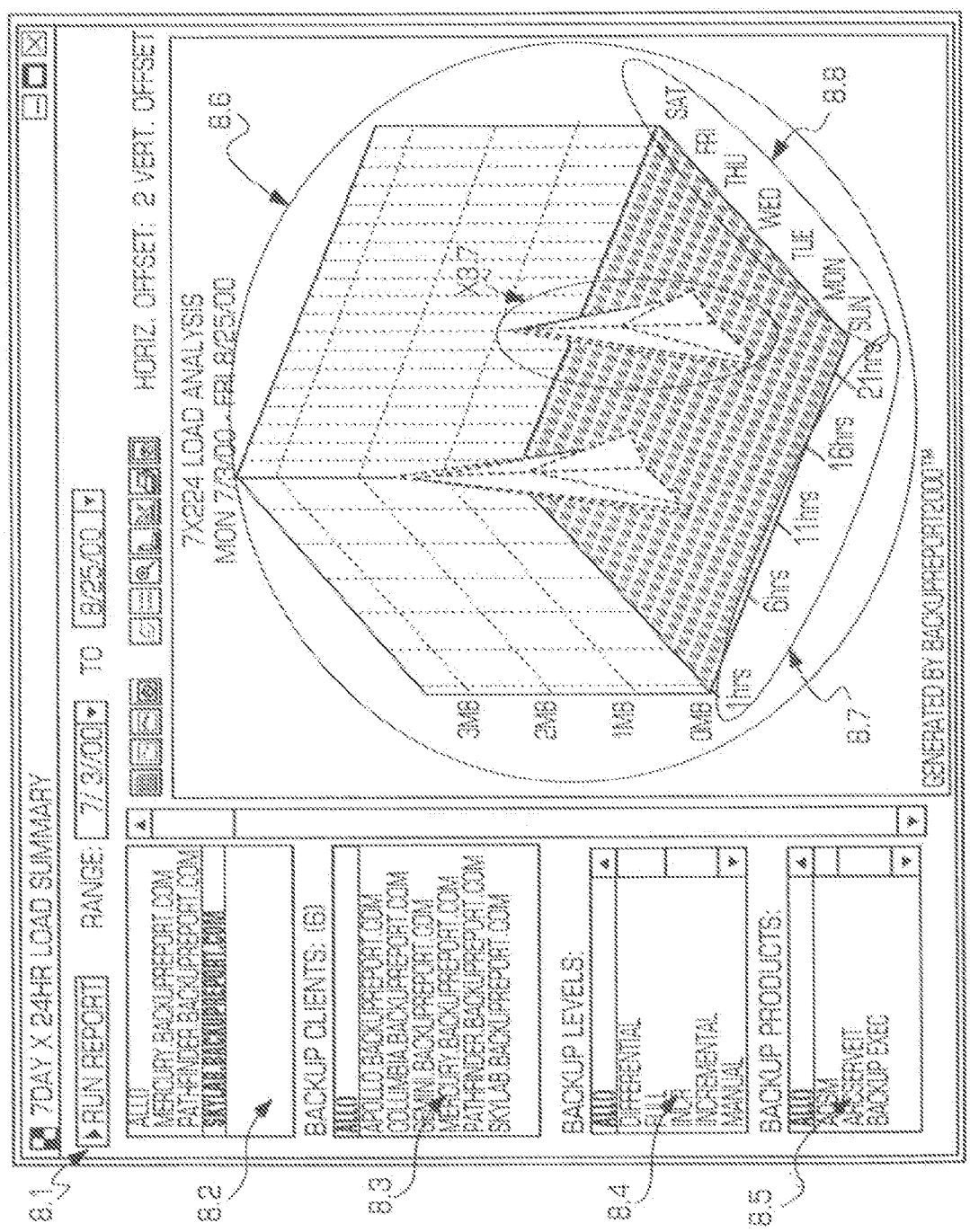

FIG. 8: a view of the 3-dimensional 7 day×24 hr load analysis report as it appears after visual representation.

DETAILED DESCRIPTION OF THE INVENTION

BRG relates to the unique means of providing backup failure identification, billing report and trend analysis production, across data originating from a plurality of backup engines and residing in a multi-purpose relational database (RDB). The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Referring to FIG. 5, Field BT7 shows that table BT includes a plurality of backup engines that have performed backup activity.

How the Invention Responds to a Request to Run/Refresh the Report (Refer to the Flowchart in FIG. 1).

The invention user is presented with an empty Failures Report container F2 (on FIG. 2).

The "container" F2 (on FIG. 2) for the report, highlighted using a rectangular box, is presented to the user in the form of a "window". In this container are: (1) several listboxes that the user can pick and choose from to narrow down the amount of data that will be included in the report, (2) an empty area on the right where the report will ultimately be displayed, and (3) a Run Report button that the user can click after they have made the selections in the listboxes in F2.B and F2.C (in FIG. 2) they wanted.

The selections are programmatically extracted from F2.B and F2.C (in FIG. 2).

Producing the Report

The base SQL Statement is Taken (see F3 of FIG. 1)

The program has received a request to run/refresh the report. The program begins to prepare a SQL Statement. In this first step, the SQL statement is very broad, that is, if it were used as is, the report would include potentially all of the data from the database. It is expected, especially where data volumes are very large, the user would make selections to narrow down the data before running the report, thereby producing a smaller, more manageably sized report.

In the preferred embodiment, the SQL Statement, would look like this typical example:

SELECT S.backupdatetime, S.backupproductname,
S.backupcanonicallevel, S.backupbytes, S.backuperrorcount,
V.servername, V.clientname, V.targetname FROM validtargets
V LEFT OUTER JOIN backups S ON (V.targetname =
S.targetname) WHERE (V.clientname = S.clientname) AND
(V.servername = S.servername) AND
V.ignoreuntil<36761.5600594097 ORDER BY V.servername,
V.clientname, V.targetname, S.backupdatetime It is important now to point out the following: The SQL statement is so structured so that it will take ALL references to "targets" (pieces of data that, at some time in the past, have been backed up at least once), regardless of whether or not backup records exist within the data range specified by the days the report is supposed to cover.

This is done using the industry-standard SQL syntax "LEFT OUTER JOIN" (you can see this in the SQL statement above). LEFT OUTER JOIN is a method that would be immediately understood by anyone familiar in the art. LEFT OUTER JOIN is used anywhere the desired result is to get ALL records from one table, joined with whatever records may be available, if any, from a second table.

Thus, the LEFT OUTER JOIN "forces" targets to appear in the report even if there are no recent backup records in the database for them. Such use of OUTER JOIN is used in accordance with principles well known in the art.

Adding Selections to Narrow Down Scope of Report (see F5 in FIG. 1)

If the request does not include selections, that is, the listboxes F2.B and F2.C (in FIG. 2) remain untouched, then process F5 will be skipped.

If selections have been made in the listboxes F2.B and F2.C (in FIG. 2), like the illustration in the example F2.D (in FIG. 2), then this is what will happen to the SQL statement:

Extra text will be added to the SQL statement toward the end of the base statement. This extra text is a "filter" that gives the SQL Server several criteria upon which it should include records. This is best illustrated with an example. If the selections shown in figure F2.D (in FIG. 2) were made, the SQL statement would look like this:

```
SELECT
    S.backupdatetime, S.backupproductname,
    S.backupcanonicallevel, S.backupbytes, S.backuperrorcount,
    V.servername, V.clientname, V.targetname FROM validtargets
    V LEFT OUTER JOIN backups S ON (V.targetname =
    S.targetname) WHERE (V.clientname = S.clientname) AND
    (V.servername = S.servername) AND
    V.ignoreuntil<36761.5760647107
    AND
    (V.clientname IN (    'gemini.backupreport.com',
    'pathfinder.backupreport.com',
    'skylab.backupreport.com'))
    ORDER BY V.servername, V.clientname, V.targetname,
    S.backupdatetime
```

Notice the extra paragraph of text (above) beginning with "AND" that was inserted towards the end of the SQL statement. In SQL terminology, this extra piece of text is referred to as a CLAUSE, and in this case, it is used to narrow down the amount of historical records of backup activity that will be returned in the report.

Note About the ORDER BY Clause.

Notice that at the end of the SQL statement there is a piece of text beginning with the words "ORDER BY". This directs the SQL Server to sort the historical records of backup activity it finds into a particular order before it sends it back to the program. One familiar in the art would immediately understand this example of SQL.

The precise order the historical records of backup activity are returned in is important, as it is relied upon in steps (see FIG. 1) F12, F15 and F18. It is used to facilitate grouping of historical records in the report into meaningful sections; for example, all of the historical records belonging to one backup server appears together in the report. This was possible because, as the program was building the report, it was able to accumulate and summarize all data for one particular backup server before moving on to and preparing for a subsequent server. The same applies to the backup clients associated with each backup server.

Thus, because the historical records of backup activity are sorted (or "ordered"), the report contents are also sorted.

SQL Request is Sent to Server (see F7 in FIG. 1)

The program then transmits to the SQL Server the prepared SQL statement.

In the preferred embodiment, this transmission is done using a means called DBLIB, which is supplied with every SQL Server installation. DBLIB is a means of connecting a software program with a SQL Server.

Batch of Records Returned from Server (see F8 in FIG. 1)

When SQL Server has executed the SQL Statement, it then returns records to the program in the form of a batch of records of the same form.

Depending on what historical records exists in the database, and what selections the user has made, any number of records may be in this batch, from none at all, to millions.

The program takes each subsequent record until either (I) all records are processed or (2) it reaches capacity for the report container, and piece-by-piece begins to assemble the report.

Preparing the Empty Report (see F2 on FIG. 2)

First, depending on what number of days the user selected F2.E (see FIG. 2), the columns in the report are expanded or reduced to match that number of days.

Then, three-letter abbreviations are inserted into each cell in the top row F2.F (see FIG. 2) of cells to show which day each column belongs to. In the right-top-most column F7.G (see FIG. 2) the text "today" is inserted to show that the right-most column belongs to today's backup activity results.

The First or Next Record is Read (see F10 in FIG. 1)

It is important to note that the current record about to be processed is not added to the report until the previous target is "wrapped up" in the report. This is done by stepping through each of the colored squares that exist to the right of that previous target in the report. As each colored square is encountered, this is what is done:

One by one, each record in the batch is read. Because the returned historical records are ordered by server, it is obvious when all the records for a given target are complete because, if comparing the target name field from record to record produces a change, we know that we must begin a new section in the report for that new target.

If this is the case, or if we have reached the end of the batch of records, the program examines the row of colored squares the program belonging to the last target just read, and changes the colors of the client row and the server row above it accordingly. This is how it decides what squares to change to what color for a given day.

1. If a target already has a red square and if the backup client it belongs to also has a red square, it does not change any color.
2. If a target has a red square and if the backup client it belongs to has a green square, and if it is the first target for that client, it changes the client's square to red.
3. If a target has a red square and the client it belongs to has a green square, and it is NOT the first target row for that client, it will change the color of the client square to mixed red and green (see example: F2H in FIG. 2).
4. If the target has a green square, and the client that target belongs to is green, it does not change any color.
5. If the target has a green square and the client has a red square, and it is the first target row for that client, it will change the color of the client's square to green.
6. If the target has a green square and the server row to which the target belongs has a red square, and it is the first target row for the server, then it will change the server square to green.
7. If the target has a green square and the server row to which it belongs has a red square and it is NOT the first target for that server, then it will change the server square to mixed red/green.
8. If the target has a mixed red/green square it will change the client square to mixed red/green, and also change the server row to which that client belongs to mixed red/green.

Now, the previous target is "wrapped up".

If the backup server name has changed from the previous record, then a new row (example of a server row: F2.N in FIG. 2) is added for that new server, and a new client row (example of a client row: F2.P in FIG. 2) is added for that new client. For each such row added, all the squares to the right are set to red.

This is what is done to add the new target to the report:

A new row is added, for the newly encountered target, to the bottom of the report. The target name is inserted as text into the left-most cell. All of the squares to the right of that target name are then colored red.

The date of the record is then examined.

1. If (a) the date corresponds to a column in the report, and (b) the record shows that at least SOME was backed up data (in other words: field BT11 on FIG. 5, field: backupbytes is not zero), then the square for that column on the new target row is set to green.
2. If (a) the date corresponds to a column in the report, and (b) the field BT11 on FIG. 5 has a zero value, then the target square is ignored (its color is not changed).
3. If (a) the date corresponds to a column in the report, and (b) the record shows that at least SOME was backed up data (in other words: field BT11 on FIG. 5, field: backupbytes is not zero), and (c) the field BT13 on FIG. 5 (errorcount) had a value greater than zero (i.e. there were errors) then the square for that column on the new target row is set to mixed green and red (see example: F2.H on FIG. 2).
1. If all of a client's targets for that day are red, then the client square will be red.
2. If all of a client's squares for that day are green, then the client square will be green.
3. If the squares of all the targets "belonging" to a given client for a given day contain a mixture of red and green squares then that client square will be mixed red/green for that day.
4. If all of the squares belonging to all the clients for a server for a given day are red, then the server square will be red for that day.
5. If all of the squares belonging to all the clients for a server for a given day are green, then the server square will also be green for that day.
6. If there is a mixture of red and green squares (including squares that are both red and green) for the clients belonging to a server, then that server square will be a mixture of red and green, illustrated by F2.i. on FIG. 2

Adding Extra Rows to the Report as Required

As the program processes more and more records, and the report gets longer and longer and more and more clients, targets and servers get added to the report, the total number of rows is increased as needed. Every time a new row needs to be added to the report, the program first checks to see if there is enough free (empty) rows available for one more row to be added. If not, then 100 extra rows are added at a time. This is for optimization; as will be understood by any person familiar in the art, it is faster to add 100 rows once, than add 1 row 100 times. This is just an optimization used in this embodiment. The same result can be achieved by simply adding each row as required. When the report is complete, then any unused (empty) rows in the report are removed.

Multi-level Reporting Method (see FIG. 3)

In addition to creating the visual aspects of the report, several other "hidden" fields are embedded in the report to facilitate identification the origin (in the database) of specific squares after the report has been displayed to the user of the program. In this following section, it will be outlined what those hidden fields are, and how they are used to produce another three levels of detail about backup activity.

Four-level Report; Three More Levels are Available but not Shown

As described earlier in this document, the report F2.L (on FIG. 2) is created with four levels of detail. The highest level is Backup Server (level 1); within each server are multiple backup clients (level 2); within each backup client are multiple backup targets (level 3); within each of these first three levels is a row of colored squares, one square for each day (level 4). There are actually four more levels of details that are made available in a manner described in the following section titled: "Adding hidden fields".

Adding Hidden Fields

The grid F2.L (on FIG. 2) contains a column that is not shown. It is referred to as column −1 (minus one). In that column, details about what the row of the report contains are placed: the backup product name, the server name, and the backup client name are placed as one single piece of string, with a semi-colon between each field, in each cell of column −1.

In the preferred embodiment, Delphi code to do this is

```
theGrid.TargetCell (−1,TheRow);
theGrid.Value:=vEngine+ ';' + vServer + ';' + vClient;
```

As the report is being created (as described above) in the grid F2.L (in FIG. 2), these fields are added as each new row is added to the report.

Thus, in combination with the date field F2.M (in FIG. 2), it is made possible to identify to which backup server, backup client, backup product, backup target and date any colored square belongs. How this is achieved is the subject of the next section, titled: "Identifying the origin of a colored square".

Identifying the Origin of a Colored Square

As described above, when the report is created, it is created with "half of the data". In other words, not every last detail about each backup activity is stuffed into the report. There is a lot more data, both in the BackupReprot2000 database and in the backup servers themselves. So, instead of creating the report to show all available data, the report is created with high and medium level data.

Only when a user specifically requests more detailed information on a given colored square (there are several ways the user can make such a request in the program, but how the program is used is beyond the scope of this description), the program examines the following fields relating to the colored square in question:
1. The contents of column −1 (column minus one) on the same row (the backup product name, the server name and the client name,
2. The contents of column 0 (column zero) on the same row, which is the first visible column in the report and contains the target name,
3. The date piece of the top left hand cell in the grid, which is column 0, row 0.

All of these pieces of data are taken and the program then attempts to get more information thus:
1. G3 (FIG. 3) A request is sent to BX asking for any messages that may be stored on the backup server itself relating to backup events on the specified day, backup server and client.
2. G6 (FIG. 3) The program does not wait (i.e. doing nothing) for BX to respond. In the preferred embodiment, the reason it does not wait is that the time it is expected to take for the backup server to respond with an answer to the request may be several seconds, perhaps minutes (in extreme situations), so for optimization, the program continues with its other tasks and handles the response later.
3. It then sends a request to the database requesting summary information relating to the backup in question. To send this request, it sends a SQL statement. In the preferred embodiment, the statement looks like this:

```
SELECT COUNT(servername) AS backupcount, servername,
clientfqhostname, targetname, SUM(backuperrorcount) AS
allerrors, backupproductname, Sum(backupbytes) AS
SumOfbackupbytes, Sum(backupfilecount) AS
SumOfbackupfilecount FROM backups B WHERE
B.servername='skylab.backupreport.com' AND
B.clientfqhostname='skylab.backupreport.com' AND
B.backupproductname='NetWorker' AND
B.backupdatetime>='8/15/00' AND B.backupdatetime<'8/16/00'
AND B.targetname='C:\program\nsr\index\apollo' GROUP BY
servername, clientfqhostname, targetname, backupproductname
```

Notice the GROUP BY clause above; This instructs the SQL Server to "summarize" the data before returning it to the program.

4. G7 (FIG. 3) When the server returns the data to the program, the data is placed into F4.A, the first "tab" or "page" of the details display container F4.

5. G8 (FIG. 3) Then a second request is sent to the database. This is another SQL statement, and this request is for detailed, record-by-record data about the backup activity for that server, client and target for that day. The SQL statement typically will look like this:

```
SELECT backupdatetime, backupbytes, backupfilecount,
backuperrorcount, servername, clientfqhostname, targetname,
backupproductname, backuplevel FROM backups B WHERE
B.servername='skylab.backupreport.com' AND
B.clientfqhostname='skylab.backupreport.com' AND
B.backupproductname='NetWorker' AND
B.backupdatetime>='8/15/00' AND B.backupdatetime<'8/16/00'
AND B.targetname='C:\program\nsr\index\apollo'
```

Notice that in the above SQL statement there is no "GROUP BY" clause. Without a GROUP BY clause, the SQL Server will respond by sending all the records without doing any summarization of the records.

6. When the program receives the response/data, it places it in F4.B (see FIG. 4) the second "tab" or "page" of the details display container F4 (see FIG. 4).

7. G11 (FIG. 3) The report details container F4 (see FIG. 4) is made visible (even though the third and last "tab" or "page" F4.C (see FIG. 4) in the container has not yet been filled).

8. G4 (FIG. 3) Some time later, BX finally returns data, if any is available. The data is placed in F4.C (see FIG. 4) if it is still visible.

Method to Construct the Backup Billing Report

The Backup Billing Reports are created by combining the contents of three (3) data tables, table BT (see FIG. 5), table CT (see FIG. 5), and table T1 (see FIG. 5) in the database, sometimes summarizing the results, and placing them in a particular order in a "report container". The following sections describe how that is done, and what specific pieces of data and software are used in the process.

The charges that appear on the billing report are calculated by multiplying the number of megabytes by the charge per megabyte stored in field T1.2 (see FIG. 5). Added to that is a charge per megabyte, taken from field T1.3 (see FIG. 5). So, even if a backup fails, which means a record with a zero value in the field BT11 (see FIG. 5), is found in the table BT (see FIG. 5), there will be a charge amount in the billing report for that backup.

It is important to point out that in all three tables, there exist data that originated from multiple backup servers, each server using any one of a plurality of backup engines on the market.

For every record in table BT (see FIG. 5) and table CT (see FIG. 5), there is a field BT7 (see FIG. 5) and table CT6 (see FIG. 5), respectively) that contains the backup engine name.

The billing reports ignore the values contained in these fields, because the billing process is designed to produce backup activity billing reports regardless of what type of backup engine performed the actual backup. Indeed, it is a central purpose, and a defining uniqueness, of this invention, to use data consolidated from a plurality of backup engines that are in use by the person(s) using the invention.

Initiating a Report Request

The user of the program initiates a report request.

Refer to the section "User presses the Run Report button" earlier in this document describing how the Failures Report was initiated. It is essentially the same as how the Billing Summary report is initiated. One exception is that the Billing Report offers a selection of "owners" that can be used to narrow down the amount of data in the report being requested.

How the Request is Processed

Based on the settings in the following items:
1. 6.2 (see FIG. 6) the list of servers
2. 6.3 the list of clients
3. 6.4 the list of owners
4. 6.5 the range of dates the report should cover.

The program constructs a SQL. In the preferred embodiment, such a SQL statement might look like this:

```
SELECT C.clientfqhostname AS clientname, O.clientowner,
SUM(backupbytes) AS totalbytes, SUM(chargeperbackup +
(chargepermegabyte*backupbytes/1024/1024)) AS totalcost,
SUM(chargeperbackup) AS totbackupcharges,
MAX(chargeperbackup) AS perbackupcharges,
SUM(B.backupfilecount) AS totalfiles,
SUM(backupbytes/1024/1024) AS totalmegabytes,
Count(C.clientfqhostname) AS backups,
AVG(O.chargepermegabyte) AS permb FROM backups B INNER JOIN
(owners O INNER JOIN clients C ON O.clientowner =
C.clientowner) ON (B.clientname = C.clientfqhostname) AND
(B.servername = C.servername) AND (B.backupproductname =
C.backupproductname) AND B.backupdatetime > '8/13/00'
AND B.backupdatetime < '8/25/00' GROUP BY
O.clientowner, C.clientfqhostname ORDER BY
O.clientowner, C.clientfqhostname
```

The SQL statement is then "sent" to the SQL Server to be applied to the database, and the program waits for a response.

The Data is Returned to the Program

When the SQL Server responds, it is in the form of a batch of records. In the preferred embodiment, the Billing Report container 6.6 (see FIG. 6) is a software component called ReportBuilder™ Pro that was selected because of its specialized report-building capabilities.

ReportBuilder allows the programmer to quickly configure within the report container an interface to the data, specifying the form of data it should use, and also specifying how the data should appear when the data is placed in the report container.

To match how this container is configured, the SQL statement was designed so that the resulting batch of data would fit exactly to the design of the report container. This is an increasingly common way to display data from a database, and it is called "Data Binding".

Although the program uses a container that was specifically designed for reports, in an alternative embodiment, the invention could have instead used a general, empty container, and assembled the report in a similar way to how 7.7 (see FIG. 7) was constructed.

Method to Construct the 7×24 Analysis Report

In many technical respects, the creation of the 7×24 analysis report 8.6 is similar to how creation of the previous report in this document (Backup Billing Report) is described.

Encompassing the differences is best done by illustrating a full example of the SQL statement that is used to bring the data back from the server. This SQL statement will be immediately understood by anyone familiar in the art.

```
SELECT Max(dayofweek) AS DOW, Max(hourofday) AS vHOD,
SUM(backupbytes)/1048576 AS SOTB FROM backups WHERE
backupbytes/1048576<>0 AND backups.backupdatetime>'7/2/00'
AND backups.backupdatetime<'8/26/00'
GROUP BY Dayofweek, hourofday
ORDER BY Dayofweek, hourofday
```

The container for the 7×24 analysis report 8.6 (see FIG. 8) is a commonly used charting tool that can be embedded in a programming environment. Although the one chosen for this particular embodiment was TeeMach ChartPro™, anyone familiar in the art might pick any one of dozens of other charting components available in the marketplace and reproduce this method.

Also, it is important to note that, even though, in this embodiment, the above SQL statement was structured in the way shown, anyone familiar in the art may construct a SQL statement as a variation of the above SQL statement and thus have the same SQL "linguistic" meaning. Thus, it is the intention of this patent application to cover all such variations that have the same linguistic meaning as the one illustrated here.

When the batch of data resulting from the above SQL Statement is returned to the program, the empty report container is prepared by the creation of an object with 3 dimensions, the first two of which are critical to this patent. These dimensions are 8.7 (see FIG. 8) and 8.8 (see FIG. 8), the 24 hours of the day along the X-axis, and the days of the week along the Z-axis.

As each record in the returned batch of data is the examined, depending on the values of the fields (in the above SQL example) Dayofweek and Hourofday, the value of the field SOTB (in the SQL statement above) is added to the relevant column. Upon reading the SQL statement, this process will be immediately understood by anyone familiar in the art.

Although in the preferred embodiment the data points are added one-by-one as the program cycles through the batch of data, a variety of embodiments could be easily created using a different embodiment. For instance: using a different chart tool than was used in this embodiment might enable one familiar in the hart to "attach" the data in one step, instead of adding the data points one by one, to that other charting tool.

Referring to FIG. 8.5 (see FIG. 8), it can be seen that data originating from one, several or all backup engines can be selected for inclusion in the report. Although in this embodiment 3 or 4 specific backup engines are listed, the method is not restricted to just those shown. Accordingly, the scope of this patent application is intended to cover the inclusion of any number of backup engines, not limited to, or necessary including, those shown in this embodiment.

It is important to note that:
1. The embodiment illustrated here is given as just one example of how the report data might get passed from the database to the program, and is not intended to limit the scope of this patent application to just that one embodiment. Rather, it is the use of one or more dimensions of time other than just dates (in this embodiment we have used day-of-week and hour-of-day) that is the essence of this method.
2. the construction of such a graphical representation, an embodiment of which is shown in FIG. 8.6, has, in a number of respects, no known precedent with regard to prior art. In addition, the fact that is represents a CONSOLIDATION of backup activity data originating from a plurality of backup engines further reinforces the uniqueness and value of the report. This is because it is only when ALL of an organization's data is viewed TOGETHER that a meaningful and truthful view of the backup activity load can be obtained.

Advantages:
1. Interoperability: A single set of examination tools that can operate with data from a plurality of backup engines offers the invention user an order of magnitude improvement in productivity and reliability over the hitherto requirement of using a multitude of engines each of which operates only with a single backup engine.
2. Reliability: Because voluminous, less relevant data has been filtered from the view of the invention user, the likelihood of missing a reported backup failure is significantly reduced.
3. Scalability: Because the backup failures report's underlying data originates from a plurality of backup engines, it is possible, in organizations using more than one backup engine to view backup activity across a larger section, and possibly all, of an organization's network of backup infrastructure in one sweep.
4. Network resource optimization: With this invention, it is possible for the first time to graphically view the entire week's backup activity load on the organization's network in one single snapshot. This knowledge makes it possible to shift, or "re-schedule" pieces of the total backup activity to different parts of the day or week in a meaningful way. "Spikes" (see 8.7 on FIG. 8) of activity can be carved up and shifted until, rather than the week being spattered with troughs of inactivity and spikes of intense activity across the network, a smoother load throughout can be effected, giving the invention user a postponement in the need for increased network resource expenditure.
5. Reduction in costs: Because one interface can now be used to examine backup activity across a plurality of backup engines, there is an immediate reduction of investment in expertise in the area of backup engines in general. The more backup engines that are in use by an organization, the bigger this advantage becomes.
6. Ability to charge for services: Never before has it been possible, without significant and unreliable technical effort, to produce charge amounts for the services of backup over a plurality of backup devices. This is of particular value to those organizations that offer backup as a core, chargeable service to their customers, other departments or other divisions inside or outside the organization.
7. Cost identification. Because the total yearly cost of providing a backup function in an organization can now be charged out on a pro-rated basis right down to the megabyte level, large organizations can now quickly and accurately determine which parts of their organization are "causing" what exact part of the cost of backups incurred by the overall backup effort. (This offers such an enormous cost insight; it is akin to the difference between having an itemized telephone bill and a telephone bill with just a total figure with no itemization.)

What is claimed is:

1. A method for visually representing backup activity successes and failures for a plurality of data backup products, the method comprising:

obtaining records from one or more data backup products, the records containing data backup activity information;

inserting the information in the records into a canonical database; and generating a visual display illustrates the backup failures and successes for one or more servers and clients and targets associated with the one or more data backup products, wherein the visual display comprises:

a first object indicating a backup failure for a backup product;

a second object indicating a backup success for a backup product and a third object indicating a backup partial failure for a backup product, wherein the visual display displays the backup status of the clients and servers and targets of the data backup products; and wherein the visual display comprises:

a first color-coded object indicating a backup failure for a client or server of a backup product, a second color-coded object indicating a backup success for a client or a server of a backup product, a third color-coded object indicating a backup partial failure for a client or a server of a backup product, and a first mixed color object that indicates the partial failure of a client or server of the data backup product; and wherein the visual display indicates by the color-coded objects.

2. The method of claim 1, wherein generating the visual display comprises selecting one or more clients and servers in order to reduce the scope of the visual display.

3. The method of claim 2, wherein the selecting comprises generating an SQL statement in order to limit the scope of the data displayed on the visual display.

4. The method of claim 1, wherein generating the visual display comprises generating a table having one or more columns and one or more rows including an element at the intersection of each column with each row, wherein each row represents one of a server and a client of a server, wherein each column represents a day of backup activity for all of the servers and clients and wherein each element represents the backup status for a particular client or server on a particular day.

5. The method of claim 4, wherein generating the visual display further comprises determining the number of days being displayed on the visual display and generating the table having a number of columns corresponding to the number of days being displayed on the visual display.

6. The method of claim 4, wherein the table comprises a server row and one or more client rows underneath the server row wherein the one or more clients are associated with the server and one or more target rows associated with a client or server corresponding to pieces of data that have been backed up.

7. The method of claim 4, wherein generating the visual display further comprises determining the color of the object being placed into an element of the table corresponding to the status of a target on a particular day, wherein the color determining comprises changing the indicator for one of the client and server based on the indicator for a particular target associated with the element of the table.

8. A data structure embodied in computer readable media for visually representing backup activity successes and failures for a plurality of data backup products, the data structure comprising:

a table having one or more columns and one or more rows including an element at the intersection of each column with each row, wherein each row represents one of a server, a client of a server and a target associated with a client, wherein each column represents a day of backup activity for all of the servers and clients and targets and wherein each element represents the backup status for a particular client or server or target on a particular day; and each element in the table comprises one of a first object indicating a backup failure for a backup product, a second object indicating a backup success for a backup product, a third object indicating a backup partial failure for a backup product, a first color-coded object indicating a backup failure for one of a client, a server and a target of a backup product, a second color-coded object indicating a backup success for one of a client, a server and a target of a backup product, a third color-coded object indicating a backup partial failure for one of a client, a server and a target of a backup product, and a first mixed color object that indicates the partial failure for one of a client, a server and a target of the data backup product, and wherein the visual display displays the backup status of the clients and servers of the data backup products are indicated by the color-coded objects.

* * * * *